United States Patent
Fowler et al.

(10) Patent No.: US 11,086,391 B2
(45) Date of Patent: Aug. 10, 2021

(54) METHODS, AND DEVICES FOR GENERATING A USER EXPERIENCE BASED ON THE STORED USER INFORMATION

(71) Applicant: AT&T INTELLECTUAL PROPERTY I, L.P., Atlanta, GA (US)

(72) Inventors: Kathleen C. Fowler, Wall Township, NJ (US); Forest Johnson, Matawan, NJ (US); Shari McNicholas, Manalapan, NJ (US); Shawn Rajguru, Parsippany, NJ (US); Pamela Juhl Sokoler, Colts Neck, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 382 days.

(21) Appl. No.: 15/364,885

(22) Filed: Nov. 30, 2016

(65) Prior Publication Data

US 2018/0150130 A1     May 31, 2018

(51) Int. Cl.
*G06F 3/01*     (2006.01)
*G10L 25/63*    (2013.01)

(52) U.S. Cl.
CPC ........ *G06F 3/011* (2013.01); *G06F 2203/011* (2013.01); *G10L 25/63* (2013.01)

(58) Field of Classification Search
CPC combination set(s) only.
See application file for complete search history.

(56) References Cited

U.S. PATENT DOCUMENTS 5,752,244 A    5/1998    Rose et al.
6,301,586 B1   10/2001   Yang et al.
(Continued)

FOREIGN PATENT DOCUMENTS

JP    4470189 B2    6/2010

OTHER PUBLICATIONS

Beckham, Jeff, "This Incredible Oculus Sim Lets Soccer Players Relive Games." Wired, wired.com, Oct. 21, 2014.
(Continued)

*Primary Examiner* — Robin J Mishler
(74) *Attorney, Agent, or Firm* — Guntin & Gust, PLC; Atanu Das

(57) ABSTRACT

Aspects of the subject disclosure may include, for example, embodiments of methods, systems, and devices for receiving user information and biometric data from groups of communication devices. Additional embodiments can include correlating and storing the user information and the biometric data in a hierarchical database according to a classification. Further embodiments can include accessing the user information and the biometric data, determining an emotional state of a user in response to processing the user information and biometric data resulting in a determined emotional state, and selecting enhanced audio content and enhanced image content according to the determined emotional state. Also, embodiments can include generating the user experience for a viewer. The user experience includes a portion of the user information, the enhanced audio content, and enhanced image content to attempt provide an emotive response from the viewer similar to the determined emotional state. Other embodiments are disclosed.

20 Claims, 8 Drawing Sheets

(56) References Cited

U.S. PATENT DOCUMENTS

| | | |
|---|---|---|
| 6,473,096 B1 | 10/2002 | Suzuki et al. |
| RE39,830 E | 9/2007 | Balabanovic |
| 7,856,429 B2 | 12/2010 | Herberger et al. |
| 8,005,806 B2 | 8/2011 | Rupp et al. |
| 8,260,189 B2 | 9/2012 | Chainer et al. |
| 8,332,344 B2 | 12/2012 | Kato et al. |
| 8,392,834 B2 | 3/2013 | Obrador et al. |
| 8,621,354 B2 | 12/2013 | Henderson et al. |
| 8,732,221 B2 | 5/2014 | Herberger et al. |
| 8,856,826 B2 | 10/2014 | Benschoter et al. |
| 8,955,031 B2 | 2/2015 | Basso et al. |
| 8,972,867 B1 | 3/2015 | Pavley et al. |
| 9,026,476 B2 | 5/2015 | Bist |
| 9,076,041 B2 | 7/2015 | Alam et al. |
| 2006/0271520 A1 | 11/2006 | Ragan et al. |
| 2007/0106484 A1 | 5/2007 | Sweatman et al. |
| 2008/0263450 A1 | 10/2008 | Hodges et al. |
| 2010/0107075 A1 | 4/2010 | Hawthorne et al. |
| 2011/0040155 A1* | 2/2011 | Guzak ............ G06F 3/0484 600/300 |
| 2012/0203853 A1 | 8/2012 | Davis et al. |
| 2013/0083003 A1 | 4/2013 | Perez et al. |
| 2013/0260360 A1 | 10/2013 | Baurmann et al. |
| 2014/0091897 A1* | 4/2014 | Lemmey ............ A61B 5/165 340/3.1 |
| 2014/0316192 A1* | 10/2014 | de Zambotti ......... A61M 21/02 600/28 |
| 2015/0106720 A1 | 4/2015 | Backer et al. |
| 2015/0346955 A1 | 12/2015 | Fundament et al. |
| 2016/0080907 A1 | 3/2016 | Saleem et al. |
| 2018/0150130 A1* | 5/2018 | Fowler ................ G06F 3/011 |

OTHER PUBLICATIONS

Czerwinski, Mary et al., "Digital memories in an era of ubiquitous computing and abundant storage." Communications of the ACM 49.1 (2006): 4450.

Jones, Gareth et al., "Information access tasks and evaluation for personal lifelogs." (2008).

Kent, James, "Your Personal Memory Device. You Could Have One Today," Humanity* Media, hplusmagazine.com, Mar. 1, 2010.

Nilsson, et al., "Sharing experience and knowledge with wearable computers." Pervasive 2004: Workshop on Memory and Sharing of Experiences. vol. 82. 2004.

* cited by examiner

300

450

METHODS, AND DEVICES FOR GENERATING A USER EXPERIENCE BASED ON THE STORED USER INFORMATION

FIELD OF THE DISCLOSURE

The subject disclosure relates to methods, systems, and devices for generating a user experience based on the stored user information.

BACKGROUND

Communication devices can store and access information associated with a user over communication networks to and from an information repository. Further, communication devices can include user devices such as mobile smartphones, wearable devices, etc. as well as third party communication devices such as location servers, security cameras (municipal, commercial, etc.) as well as social media servers. Further, a user can configure access to user information to various parties. User information can be provided according access permissions and displayed on various media devices. The bandwidth of modern communication networks allows for not only textual information but also audio, image and video information to be presented on the various media devices.

BRIEF DESCRIPTION OF THE DRAWINGS

Reference will now be made to the accompanying drawings, which are not necessarily drawn to scale, and wherein.

DETAILED DESCRIPTION

Figure 1:
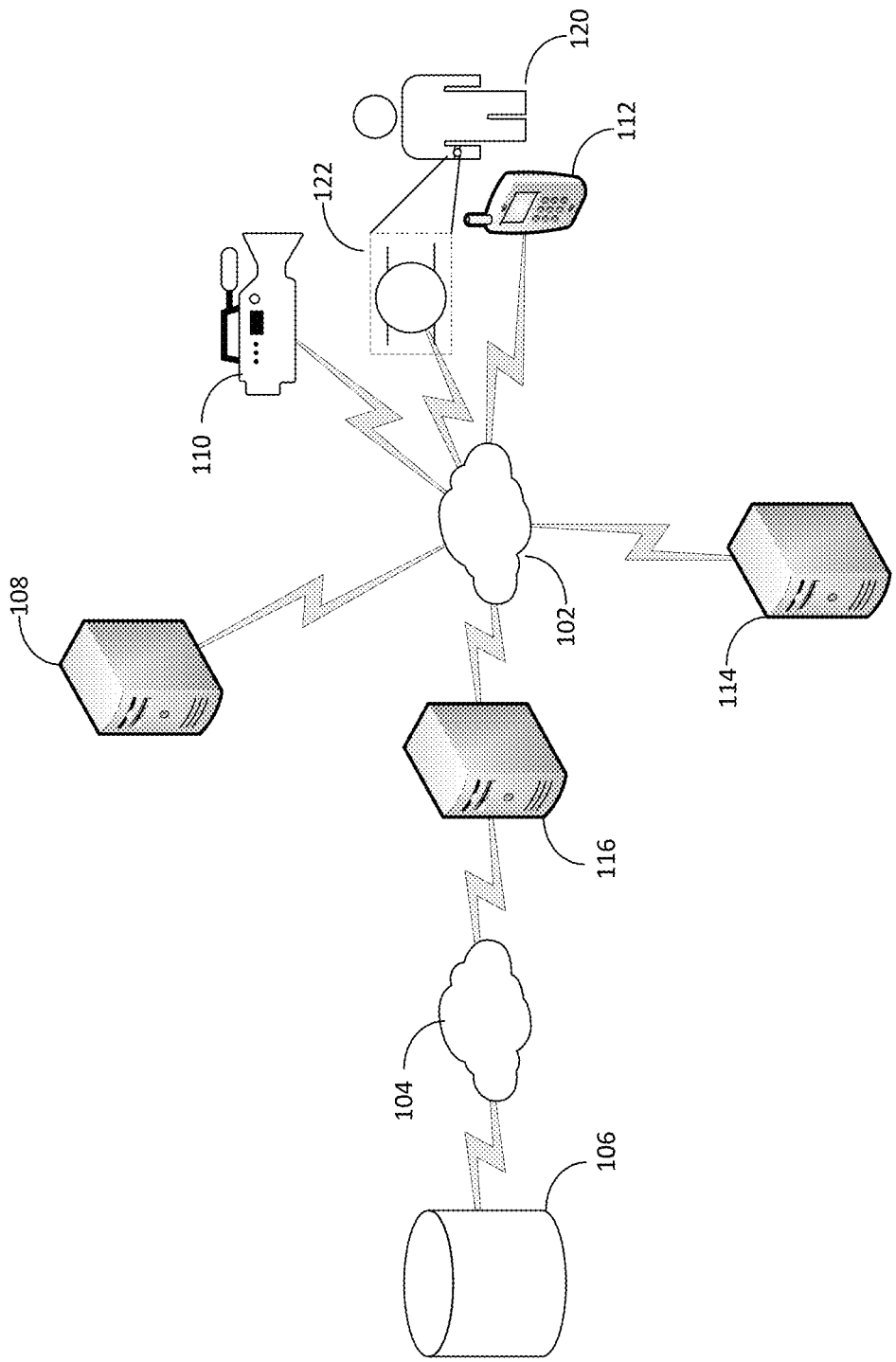
FIGS. 1-3 depict illustrative embodiments for generating an alert or a user experience based on the stored user information.

The subject disclosure describes, among other things, illustrative embodiments for receiving user information from a first group of communication devices. Further embodiments include obtaining biometric data from a second group of communication devices. Additional embodiments include correlating among the user information and the biometric data to generate a classification. Also, embodiments include storing the user information and the biometric data in a hierarchical database according to the classification. Further embodiments include receiving a request for a user experience. Additional embodiments include accessing the user information and the biometric data. Also, embodiments include determining an emotional state of a user in response to processing the user information and biometric data resulting in a determined emotional state. Further embodiments include selecting enhanced audio content and enhanced image content according to the determined emotional state. Additional embodiments include generating the user experience for a viewer in response to receiving the request. The user experience includes a portion of the user information, the enhanced audio content, and enhanced image content to attempt provide an emotive response from the viewer similar to the determined emotional state. Also embodiments include presenting the user experience on a display for the viewer. Other embodiments are described in the subject disclosure.

One or more aspects of the subject disclosure can include a method. The method includes obtaining, by a processing system including a processor, biometric data from a first group of communication devices. Further, the method includes receiving, by the processing system, user information from a second group of communication devices. In addition, the method includes correlating, by the processing system, among biometric data and the user information to generate a classification. Also, the method includes storing, by the processing system, the biometric data and the user information in a hierarchical database according to the classification. Further, the method includes receiving, by the processing system, a request for a user experience. In addition, the method includes identifying, by the processing system, the classification from the request. Also, the method includes accessing, by the processing system, the biometric data and the user information from the hierarchical database according to the classification. Further, the method includes generating, by the processing system, the user experience according to the biometric data and the user information. In addition, the method includes presenting, by the processing system, the user experience on a virtual display for a viewer. The user experience is a virtual user experience that attempts to provide an emotive response to the viewer according to the biometric data and the user information.

One or more aspects of the subject disclosure includes system comprising a processing system including a processor and a memory that stores executable instructions that, when executed by the processing system, facilitate performance of operations. The operations can include receiving user information from a first group of communication devices. Further operations can include obtaining biometric data from a second group of communication devices. Additional operations can include correlating among the user information and the biometric data to generate a classification. Also, operations include storing the user information and the biometric data in a hierarchical database according to the classification. Further operations can include receiving a request for a user experience. Additional operations can include accessing the user information and the biometric data. Also, operations can include determining an emotional state of a user in response to processing the user information and biometric data resulting in a determined emotional state. Further operations can include selecting enhanced audio content and enhanced image content according to the determined emotional state. Additional operations can include generating the user experience for a viewer in response to receiving the request. The user experience includes a portion of the user information, the enhanced audio content, and enhanced image content to attempt provide an emotive response from the viewer similar to the determined emotional state. Also, operations can include presenting the user experience on a display for the viewer.

One or more aspects of the subject disclosure include a machine-readable storage medium, comprising executable instructions that, when executed by a processing system including a processor, facilitate performance of operations. The operations include receiving user audio content and user image content from a first group of communication devices. Further operations include obtaining biometric data from a second group of communication devices. Additional operations can include correlating among the user audio content, user image content, and biometric data to generate a classification. Also, operations can include storing the user audio content, user image content, and biometric data in a hierarchical database according to the classification. Further operations receiving a request for a user experience. Additional operations can include accessing the user audio content, user image content, and the biometric data. Also, operations can include determining an emotional state of a user in response to processing the user audio content, user image content, and biometric data resulting in a determined emotional state. Further operations can include selecting enhanced audio content and enhanced image content according to the determined emotional state. Additional operations can include generating the user experience for a viewer in response to receiving the request. The user experience includes a portion of the user audio content, user image content, the enhanced audio content, and enhanced image content to attempt provide an emotive response from the viewer similar to the determined emotional state. Also, operations can include presenting the user experience on a display for the viewer.

FIG. 1 depicts an illustrative embodiment of a system 100 for storing correlated user information in a hierarchical database. In one or more embodiments, the system 100 can provide a service for storing correlated user information and then generating and presenting a user experience based on the stored correlated user information. In some embodiments, the service can be used to record or archive memories for the user. This allows for the user to store, record, and archive captured textual, audio, image, and video information from not only user devices but external devices (e.g. security cameras, location servers, etc.) to be accessed at a future time. In other embodiments, the captured textual, audio, image, and video information can be used accessed by a relative (e.g. spouse, child, parent, etc.) to experience a memory stored in the hierarchical database 106 (e.g. after the user has passed away). In further embodiments, a caregiver can access the captured textual, audio, image, and video information to obtain caretaking information for the user (e.g. medication information, physical therapy information, psychological therapy information, etc.). In such embodiments, the user may be incapacitated (e.g. unconscious, suffering from dementia, etc.) and cannot convey caretaking information to the caregiver. In additional embodiments, personnel of a former employer of the user can access the captured textual, audio, image, and video information after the user has left the former employer. The former employer can use captured textual, audio, image, and video information to train a newly hired employee for the user's past job function.

The service can be a subscription service for a fee that provides different tiers of service. For example, a user may subscribe to a service that stores user information of particular type(s). That is, the user can pay a fee for service of storing only textual user information and provide a user experience based on only the stored textual user information. Alternatively, the user can pay a higher fee for storing not only text user information but also audio, image and video user information and to provide a user experience accordingly. Further, subscription fees can be higher for users that provide access to several different third parties (e.g. relatives, caregivers, etc.) The service can also be subscribed by entities such as companies to retain information from past employees to train newly hired employees.

In one or more embodiments, the system 100 can include a group of user devices such as a smartphone 112 and a fitness tracker 122 (e.g. Fitbit™ device, Nike™ Fuel™ band, etc.) for a user. The group of user devices can capture user information. For example, the smartphone 112 can capture audio, images and video associated with the user 120 and the fitness tracker can capture biometric data such as heart rate, blood pressure, etc. In other embodiments, user devices can include laptop computers, desktop computers, tablet computers, media devices (e.g. televisions, DVD or Blu-Ray™ media players, etc.), wearable devices, implants with computer chips (e.g. in the brain of the user) for monitoring biometric data of the user, etc. User devices can not only be communication devices that are owned and operated by the user but also communication devices owned by a third party (e.g. employer purchases mobile phones, computers, etc.) but operated by the user.

In one or more embodiments, the system 100 can include a group of external devices that capture user information. External devices can include, but are not limited to, communication devices operated by third parties but are not or tangentially associated with the user. The system 100 can include an external device such as a security camera 110 of a commercial or residential premises not directly associated with the user. The security camera 110 can be municipal security camera 110 that is happened to be pointed toward the user's residence and the system 100 has access to the audio, images, and video information captured by the security camera 110. Further, the system 100 can include a location server 108 communicating with the user's smartphone 112 that can capture location information of the user 120. In addition, the system 100 can include a social media server 114 that can capture social media information associated, pertaining, or of interest to the user 120. Such social media information can not only be text, audio, image, and video information posted on one or more social media Internet sites but also social media information posted by social media connections, social media information posted by social media groups related to the user 120, and social media information related to the demographic of the user 120. In addition, user information captured by external devices can also include biometric data. For example, the system can have access to government databases that stored a user's driver license photograph or fingerprints.

In one or more embodiments, the external devices 108, 110, 114 and the user devices 112, 122 provide user information that can include biometric data pertaining to the user to a correlation server 116 over a communication network 102. The correlation server 116 receives the user information and correlates the information among itself to generate a classification to store the user information in a hierarchical database 106 over another communication network 104. The user 120 can provide input to assist the correlation server 116 to correlate the user information. For example, the correlation server 116 may have received captured audio, images and video from the smartphone 112 as well as heartrate and blood pressure biometric data from the fitness tracker 122. Further, the user 120 can provide a message to the correlation server 116 shortly after receiving the user information (i.e. captured images, video, and biometric data) to indicate the user is attending his child's first soccer game and the user information pertains to the child scoring a goal. Thus, in conjunction with analyzing the images and video using image recognition techniques to identify images of the user's child as well as the elevated heartrate and blood pressure indicating excitement, the user input allows the correlation server 116 to generate a classification such as "Child's Sports Memory." Further, the correlation server 116 stores the user information according to the classification into the hierarchical database 106. In some embodiments, the hierarchical database is not communicative coupled over a communication network 104 but more directly communicatively coupled (e.g. wired, wirelessly, etc.). In addition, an exemplary hierarchy in the hierarchical database can be Parent Memories>Child 1 (Name) Memories>Child 1 Sports Memories. Thus, the user information is stored in such a hierarchy according to the classification.

In one or more embodiments, the correlation server 116 can generate or be provisioned with a rules-based correlation algorithm. For example, the correlation server 116 can receive user information from the location server 108 indicating that the smartphone 112 is at a youth soccer field. Further, correlation server 116 can discern the user's child playing soccer from the captured images and video provided by the smartphone 112. The rule-based correlation algorithm can be provided the location of the user (e.g. youth soccer field) and the subject matter of the captured audio, images and video (e.g. user's child playing soccer) and generate a classification for the user information (e.g. Child's Sport Memory). Additionally, the correlation server 116 stores the user information in the hierarchical database 106 according the classification.

In one or more embodiments, the correlation server can implement machine learning on data sets resulting in a learning algorithm and correlate user information according to the learning algorithm. In some embodiments, the data sets can be past user information provided by the group of user devices and/or group of external devices. For example, the correlation server 116 may have received at the same time and day the week prior, captured images and video of the user's child playing soccer at the same location. The learning algorithm may then determine due to the past user information being classified as Child's Sports Memory, then the correlation server 116 also classifies the current user information as Child Sports Memory. Additionally, the correlation server 116 stores the user information in the hierarchical database 106 according the classification.

In other embodiments, the correlation server 116 can implements machine learning on data sets (e.g. training data sets) that do not include user information. For example, the data sets can include information of other users at the same location of the current user 120. The information of other users can include captured image of children soccer games. Thus, correlation server 116 can generate a learning algorithm that identifies images/videos of children's soccer games that the youth soccer field to be a stored according to the classification Child Sports Memory. Thus, when the correlation server 116 receives user information related to the user 210, the correlation server 116 can generate the classification Child Sports Memory according to the learning algorithm. In other embodiments, machine learning can be applied to biometric data and user input data as well for classification purposes of each.

The correlation server 116 can also process biometric data such heart rate and blood pressure as well as the tone of voice in captured audio and body language perceived using image recognition techniques on captures images and video to determine the mood or emotion of the user. Further, the correlation sever 116 can classify received user information according to mood or emotion (e.g. happy, sad, angry, anxious, etc.). In addition, the correlation server can implement machine learning on the biometric data and/or the user information to classify the biometric data or user information according to mood or emotion.

The communication networks 102, 104 can be wired and/or wireless networks as well as combination thereof. Further, the communication networks 202, 204 can be proprietary communication networks and/or part of the Internet.

Figure 2:
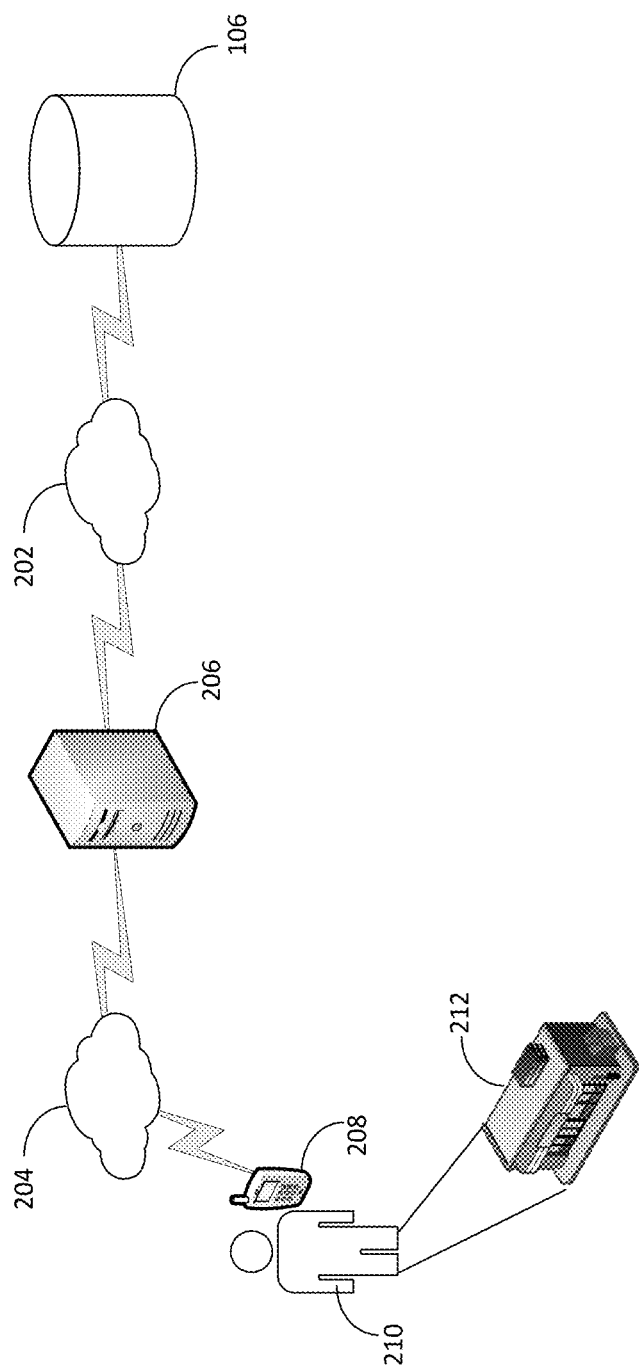

FIG. 2 depicts an illustrative embodiment of a system 200 for generating an alert based on stored user information. In one or more embodiments, the system 200 can include a hierarchical database 106 communicatively coupled to an application server 206 over a communication network 202. Further, the application server 206 can be communicatively coupled to a smartphone 208 of a user 210.

In one or more embodiments, the user 210 can subscribe (for a fee) to a service from a service provider that operates the application server 206 and hierarchical database 106 (as well as the correlation server 116). The service can include providing alerts based on the current user information. That is, the application server 206 can be provided current user information, generate a classification according to the current user information, and access stored user information according to the classification. Further, the application server 206 may generate an alert to the smartphone 208 for the user 210 according to and processing of the current user information and the stored user information.

For example, the current user information can include the location information of the smartphone, the direction in which the smartphone is traveling, and the likely destination of the smartphone, which can be a restaurant 212. This current user information may be provided to the application server 206. Further, the application server 206 can determine a classification according to the current user information such as the name of the restaurant 212. The application server 206 may search the hierarchical database 106 and access stored user information according to the name of the restaurant 212. The stored user information can include the last date the user 210 visited the restaurant 212 as well as the biometric data (e.g. heart rate, blood pressure, etc.) related to the user around the time the user last visited the restaurant 212. The application server 206 can process the stored user information including comparing the biometric data to typical ranges of the biometric data for certain ailments determine that the user 210 may have had food poisoning resulting from the user's last visit to the restaurant 212. Thus, the application server 206 can provide an alert to the smartphone 208 over communication network 204 indicating to the user 210 that the user 210 may have suffered food poisoning after his last visit to the restaurant 212 and to avoid eating there again.

In another example, the application server 206 can determine the likely destination of the user 210 may be the restaurant 212. Further, the application server 206 may access the stored user information from the hierarchical database 106. The stored user information can include an indication that the user is allergic to gluten. Further the stored user information can include menu information of the restaurant 212 (obtained by external devices such as the web server hosting the website of the restaurant). The application server 206 can process the stored user information with the menu information to determine that the number of gluten free items on the menu are below a predetermined threshold (for example, the user may have provisioned the application server, a priori, that if the number of gluten free items on a menu is below three items to generate an alert). In response, the application server 206 can send an alert to the smartphone 208 over the communication network 204 to the user 210 indicating that the restaurant 212 does not have a number of gluten free items above the predetermined threshold on its menu. Based on the alert, the user 210 can determine whether or not to eat at the restaurant 212.

The communication networks 202, 204 can be wired and/or wireless networks as well as combination thereof. Further, the communication networks 202, 204 can be proprietary communication networks and/or part of the Internet.

Figure 3:
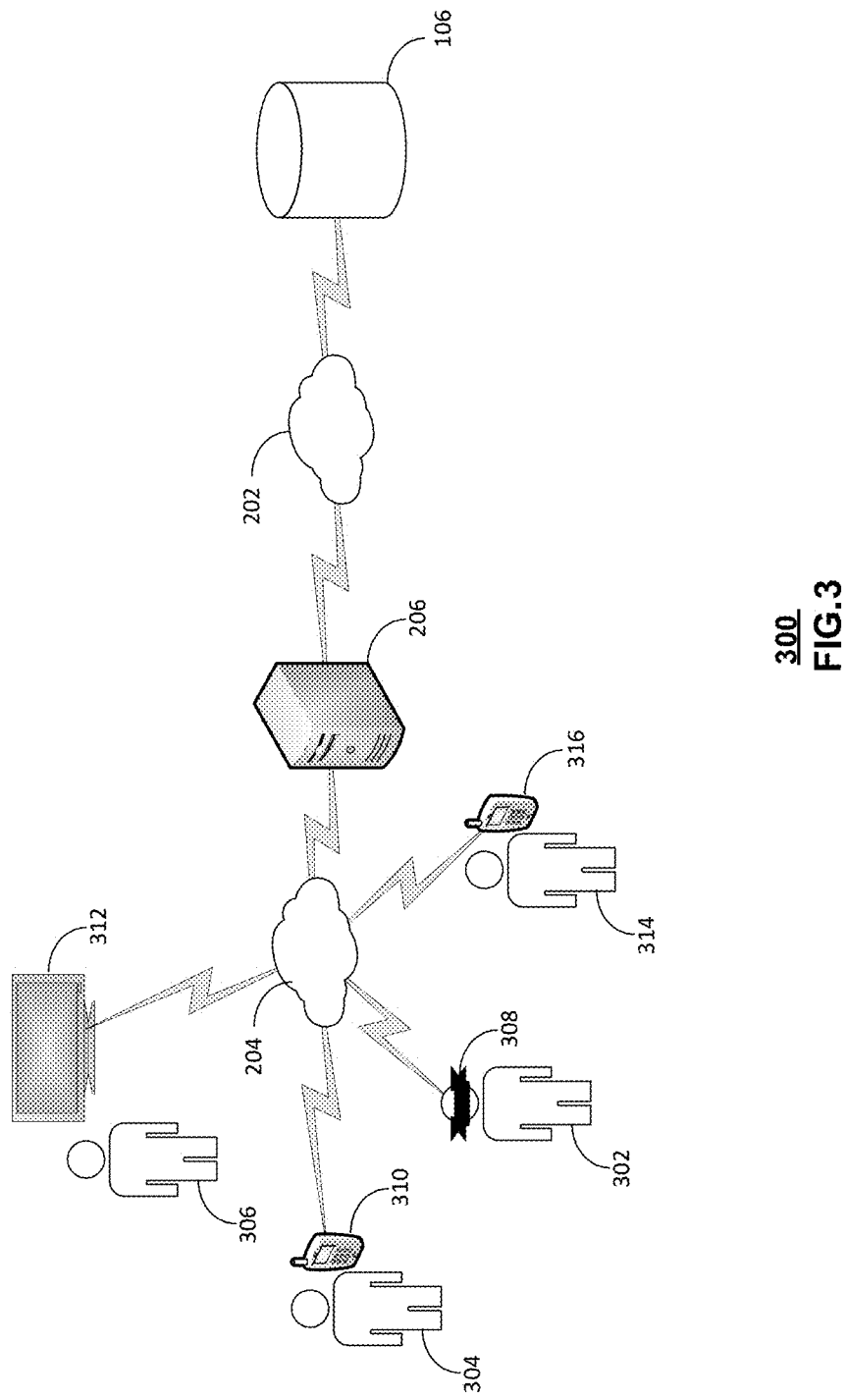

FIG. 3 depicts an illustrative embodiment of a system 300 for generating a user experience based on the stored user information. In one or more embodiments, the system 300 can include a hierarchical database 106 that stores user information and is communicatively coupled to the application server 206 over the communication network 202. Further, the application server 206 is communicatively coupled to a media device (e.g. television, monitor, display, etc.) over the communication network 204.

In one or more embodiments, the application server 206 can receive a request for a user experience from a communication device 316 (e.g. mobile phone) of a user 314. The user experience can include captured textual, audio, image, and video information stored in the hierarchical database 106 presented in a display of a communication device and/or media device. Such captured textual, audio, image, and video information can be presented to attempt to elicit an emotive response from the user 314 similar to when the textual, audio, image, and video information was captured.

In one or more embodiments, the request can include a reference. The reference can be related to the user experience such as, but not limited to, a date, an event type, or a person. For example, a reference can include "Child's soccer game in the fall of 2012." Generally, the application server 206 can identify the classification from the request. Particularly, the application server 206 can identify the classification according to the reference in the request. For example, the reference that includes "Child's soccer game in the fall of 2012" that can be processed by the application server 206 to identify the classification "Child's Sports Memory." The application server 206 can access stored user information from the hierarchical database 106 according to the classification. Further, the application server presenting, or providing the user experience to be presented, on a display of the communication device 316 for user/viewer 314. The user experience includes presenting the captured textual, audio, image, and video information stored as user information in the hierarchical database 106.

In one or more embodiments, the request is provided by a communication device 310 associated with a third party that has a relationship with a user. For example, the third party can be a caregiver 304 who would like access to a user experience that provides caretaking information regarding the user (e.g. medication, physical therapy, psychological therapy). The user may not be able to convey such caretaking information because the user may be incapacitated (e.g. unconscious, suffering from dementia, etc.). The reference is such a request can be "Medication." The application server 206 can process the request include the reference to identify a classification "User Health Information." Further, the application server 206 can access the captured textual, audio, image, and video information according to, or associated with, the classification from the hierarchical database 106. In addition, the application server 206 can provide the captured textual, audio, image, and video information as a user experience to the communication device 310 (e.g. mobile phone) to presented on its display to the caregiver 304.

In one or more embodiments, the third party can be personnel 306 of a former employer of the user that would like to view a user experience with regard to user information pertaining to the user's job function and role with the former employer for training purposes. The request can include a reference such as "User Name." The user may have been a project manager for the former employer. Thus, the application server 206 can process the request and reference to identify the classification "Project Manager Function." In addition, the application server 206 can access captured textual, audio, image, and video information from the hierarchical database 106 according to, or associated with, the classification. Also, the application server 206 can provide the captured textual, audio, image, and video information as a user experience to the media device 310 (e.g. television, monitor, etc.) to presented on its display.

In one or more embodiments, the request can include a reference related to the user experience such as, but not limited to, a date, an event type, or a person. For example, a reference can include "Child's soccer game in the fall of 2012." Further, the method 400 can include, at 412, the application server 206 identifying the classification from the request. For example, the application server 206 can process the request and reference to identify the classification "Child Sports Memory." In addition, the application server 206 accessing captured textual, audio, image, and video information from the hierarchical database according to the classification. Also, the application server 206 can generate the user experience according to the captured textual, audio, image, and video information. Further, the application server 206 can present, or provide the user experience to be presented, on a display of a communication device for a viewer 302. In some embodiments, the display can be a virtual reality display 308 and the user experience includes a virtual reality experience in a virtual reality environment (e.g. that uses the Oculus™ virtual reality devices) that attempts to provide an emotive response to the viewer according to the captured textual, audio, image, and video information. The captured textual, audio, image, and video information can include biometric data (e.g. heart rate, blood pressure) that can be used in conjunction with other captured information to determine the emotive condition of the user at the time the information was captured. For example, the captured information can include captured images and video from the user's child's soccer game that include showing the child scoring their first soccer goal. Further, the captured information can include biometric data of the user from a biometric device or fitness tracker. The biometric data can include the user's heart rate and blood pressure at the time of capturing the images and videos. The application server 206 can process the biometric data, the tone of voice in the captured audio using voice recognition techniques, and the body language from captured images and video using image recognition techniques to determine the emotional state of the user when capturing the user information. When generating the user experience (e.g. in a virtual reality environment on a virtual reality display), the application server 206 can attempt to present the captured audio, images and video to attempt to provide an emotive response according to the emotional state of the user when capturing the images and video. This can include attempting to cause the viewer having the same heart rate and blood pressure as the user when the user captured the images and video.

Figure 4A:
FIGS. 4A-4B depicts an illustrative embodiment of a method used in portions of the systems described in FIGS. 1-3.

FIG. 4A depicts an illustrative embodiment of a method 400 used by systems 100, 200, 300. In one or more embodiments, portions of method 400 can be implemented by a correlation server, an application server, and/or a hierarchical database. Further, the correlation server, the application server, and/or the hierarchical database can be on separate network devices communicatively coupled in a system or they can all be on the same network device. The method 400 can include, at 402, the correlation server receiving first portion of user information from multiple user devices. Further, the method 400 can include, at 404, the correlation server receiving second portion of user information from multiple external devices. The first portion of user information or the second portion of user information can include biometric data of the user. In addition, the method 400 can include, at 406, the correlation server correlating among the first portion of user information and second portion of user information to generate a classification. In some embodiments, the correlation server receives user input either regarding the first portion of user information and second portion of user information, or in assisting the correlating of the first portion of user information and second portion of user information. For example, the user can provide a message indicating the first portion of user information and the second information is a "Child's Soccer Game" or the user can provide a message that includes "Child Sports Memory" indicating he classification in which to correlate the first portion of user information and the second portion of user information. Further, the correlating server can then correlate the first portion of user information and second portion of user information according to the user input. In other embodiments, the correlation server can generate or be provisioned with a rules-based correlation algorithm. In addition, the correlation server can correlate the first portion of user information and the second portion of user information according to the rules-based correlation algorithm. In further embodiments, the correlation server can implement machine learning on multiple data sets resulting in a learning algorithm. The multiple data sets can be past user information, information of other users, or training data sets to generate the learning algorithm. Additionally, the correlation server can correlate the first portion of user information and the second information according to the learning algorithm. In some embodiments, the correlation server can correlate the first portion of user information and/or second portion of user information according to a combination of user input, the rules-based correlation algorithm, and/or learning algorithm.

The method 400 can include, at 408, the correlation server storing the first portion of user information and the second portion of user information in a hierarchical database according to the classification. Further, the method can include, at 410, an application server receiving a request for a user experience. In some embodiments, the request is provided by a communication device associated with a third party that has a relationship with a user. For example, the third party can be a child of the user and would like to access and have a user experience of the child's memories as youngster after the user has passed away. In another example, the third party can be a caregiver who would like access to a user experience that provides caretaking information regarding caring for the user (e.g. medication, physical therapy, psychological therapy). The user is incapacitated and unable to convey the caretaking information to the caregiver. In a further example, the third party can be personnel of a former employer of the user that would like to view a user experience with regard to the user's job function and role with the former employer for training purposes.

In other embodiments the request can include a reference. The reference can be related to the user experience such as, but not limited to, a date, an event type, or a person. For example, a reference can include "Child's soccer game in the fall of 2012." Further, the method 400 can include, at 412, the application server identifying the classification from the request. Particularly, in some embodiments, the application server can identify the classification according to the reference in the request. In addition, the method 400 can include, at 414, accessing the first portion of user information and the second portion of user information from the hierarchical database according to the classification.

The method 400 can include, at 416, the application server generating the user experience according to the first portion of user information and the second portion of user information. Further, the method 400 can include, at 418, the application server presenting, or providing the user experience to be presented, on a display for a viewer. In some embodiments, the display can be communicatively coupled to a media device such as television, set top box, media process, tablet computer, laptop computer, desktop computer, mobile device, ocular device (e.g. Google Glasses™), wearable device, mobile phone, smartphone, etc. In other embodiments, the display can be a virtual reality display and the user experience includes a virtual reality experience in a virtual reality environment (e.g. that uses the Oculus™ virtual reality devices) that attempts to provide an emotive response to the viewer according to the first portion of user information and the second portion of user information. For example, the first portion of user information and second portion of user information can include captured, audio, images and video from the user's child's soccer game that include showing the child scoring their first soccer goal. Further, the first portion of user information and the second portion of user information can include biometric data of the user from a biometric device or fitness tracker. The biometric data can include the user's heart rate and blood pressure at the time of capturing the audio, images and videos. The application server can process the biometric data, the tone of voice in the captured audio using voice recognition techniques, and the body language from captured images and video using image recognition techniques to determine the emotional state of the user when capturing the user information. When generating the user experience (e.g. in a virtual reality environment on a virtual reality display), the application server can attempt to present the captured audio, images and video to attempt to provide an emotive response according to the emotional state of the user when capturing the images and video. This can include attempting to cause the viewer having the same heart rate and blood pressure as the user when the user captured the images and video.

Figure 4B:
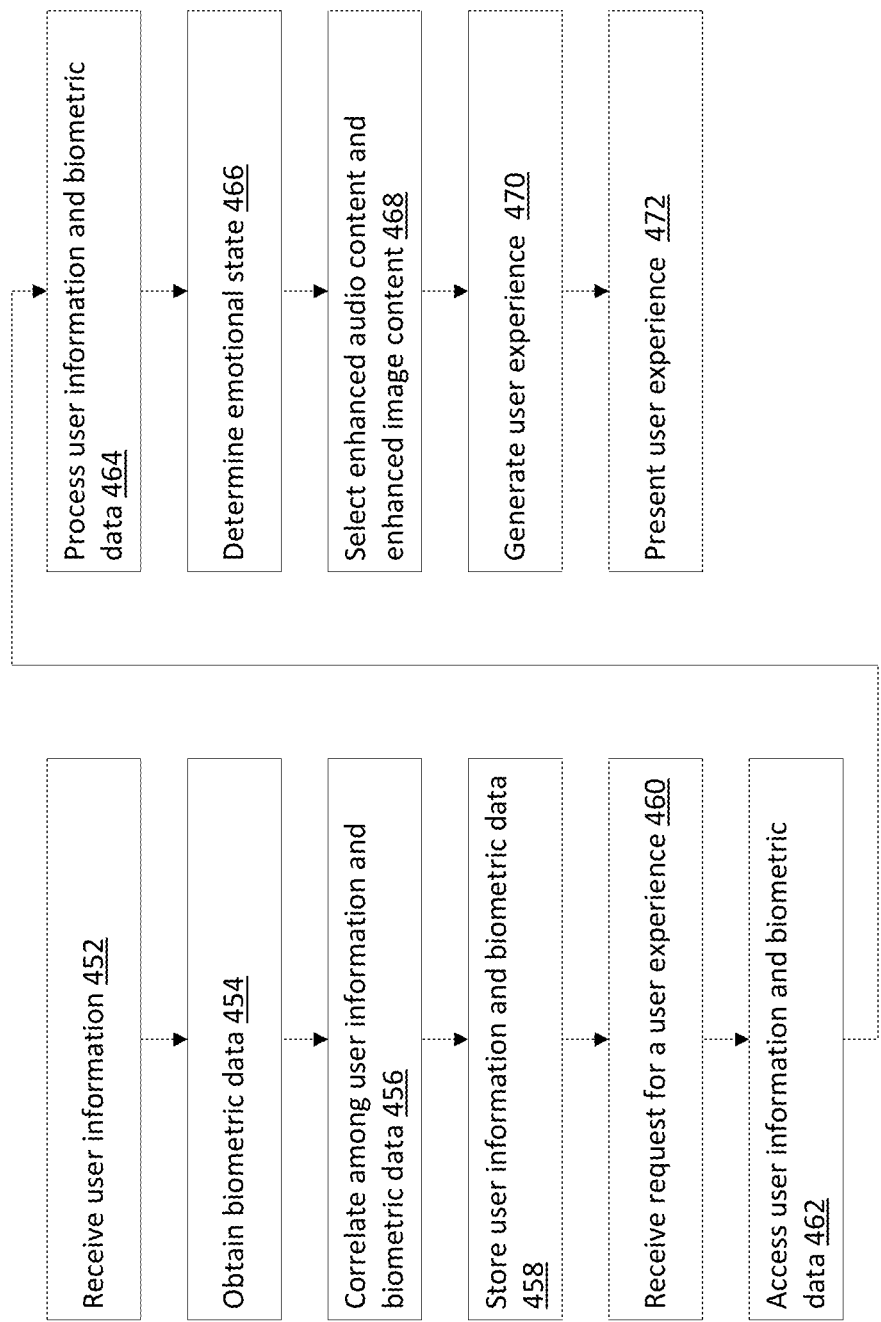

FIG. 4B depicts an illustrative embodiment of a method 450 used by systems 100, 200, 300. In one or more embodiments, portions of method 450 can be implemented by a correlation server, an application server, and/or a hierarchical database. Further, the correlation server, the application server, and/or the hierarchical database can be on separate network devices communicatively coupled in a system or they can all be on the same network device. The method 450 can include, at 452, a correlation server receiving user information from a first group of communication devices. Further, the method 450 can include, at 454, the correlation server obtaining biometric data from a second group of communication devices. In addition, the method 450 can include, at 456, the correlation server correlating among the user information and the biometric data to generate a classification. Also, the method 450 can include, at 458, the correlation server storing the user information and the biometric data in a hierarchical database according to the classification.

Further, the method 450 can include, at 460, an application server receiving a request for a user experience. Additionally, the method 450 can include, at 462, the application server accessing the user information and the biometric data. Also, the method 450 can include, at 464, processing the user information and biometric data. Further, the method 450 can include, 466, determining an emotional state of a user in response to processing the user information and biometric data resulting in a determined emotional state. In addition, the method 450 can includes, at 468, the application server selecting enhanced audio content and enhanced image content according to the determined emotional state. The method can also include, at 470, the application server generating the user experience for a viewer in response to receiving the request. The user experience includes a portion of the user information, the enhanced audio content, and enhanced image content to attempt provide an emotive response from the viewer similar to the determined emotional state. The method can include, at 472, the application server presenting the user experience on a display for the viewer. In some embodiments, the display is a virtual reality display and the user experience comprises a virtual reality experience.

The user information can include audio information or user audio content as well as image information, user image content, or video content. Further, the application server can process the audio information or user audio content using voice recognition techniques. Such a process can identify a tone of voice of one or more people in the video content of the user information including the user. The application server can look up in an information repository an emotional state or a range of emotional states corresponding to the identified tone of voice of the user or other people in the video content of the user information.

Further, the application server can process the image information or user image content using image recognition techniques. Such a process can identify a body language of one or more people in the video content of the user information including the user. The application server can look up in an information repository an emotional state or a range of emotional states corresponding to the identified body language of the user or other people in the video content of the user information.

In addition, the biometric data includes heartrate and blood pressure of the user. The application server can process the biometric data to determine and emotional state or a range of emotional states of the user. The application server can look up in an information repository an emotional state of a range of emotional states corresponding to the biometric data (e.g. heartrate, blood pressure, etc.).

Information regarding emotional states corresponding to tone of voice, body language, biometric data (heartrate, blood pressure, etc.) can be stored in the information repository by a service provider.

In response to determining an emotional state or a range of emotional states based on processing audio information/content, image information/content, and/or biometric data, the application server can select enhanced audio content or enhanced image content to include in the user experience. Enhanced audio content can be adding a soundtrack, laugh track, applause, increasing sound resolution on dialogue, dampening ambient sound, or any other sound effects. Enhanced image content can be fast or slow playback, increasing resolution of portions or some images of video content, decreasing resolution of portions or some images of video content, creating a montage, or any other visual effect. For example, if the emotional state is determined to be sadness, the application server can select somber music to a soundtrack to the video content as enhanced audio content. Further, the application server can select a montage visual effect for images in the video content. In another example, if the emotional state is determined to be happiness, the application server can select uplifting music to a soundtrack to the video as enhanced audio content. In addition, the application server can slow the playback for dramatic effect.

While for purposes of simplicity of explanation, the respective processes are shown and described as a series of blocks in FIGS. 4A-4B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
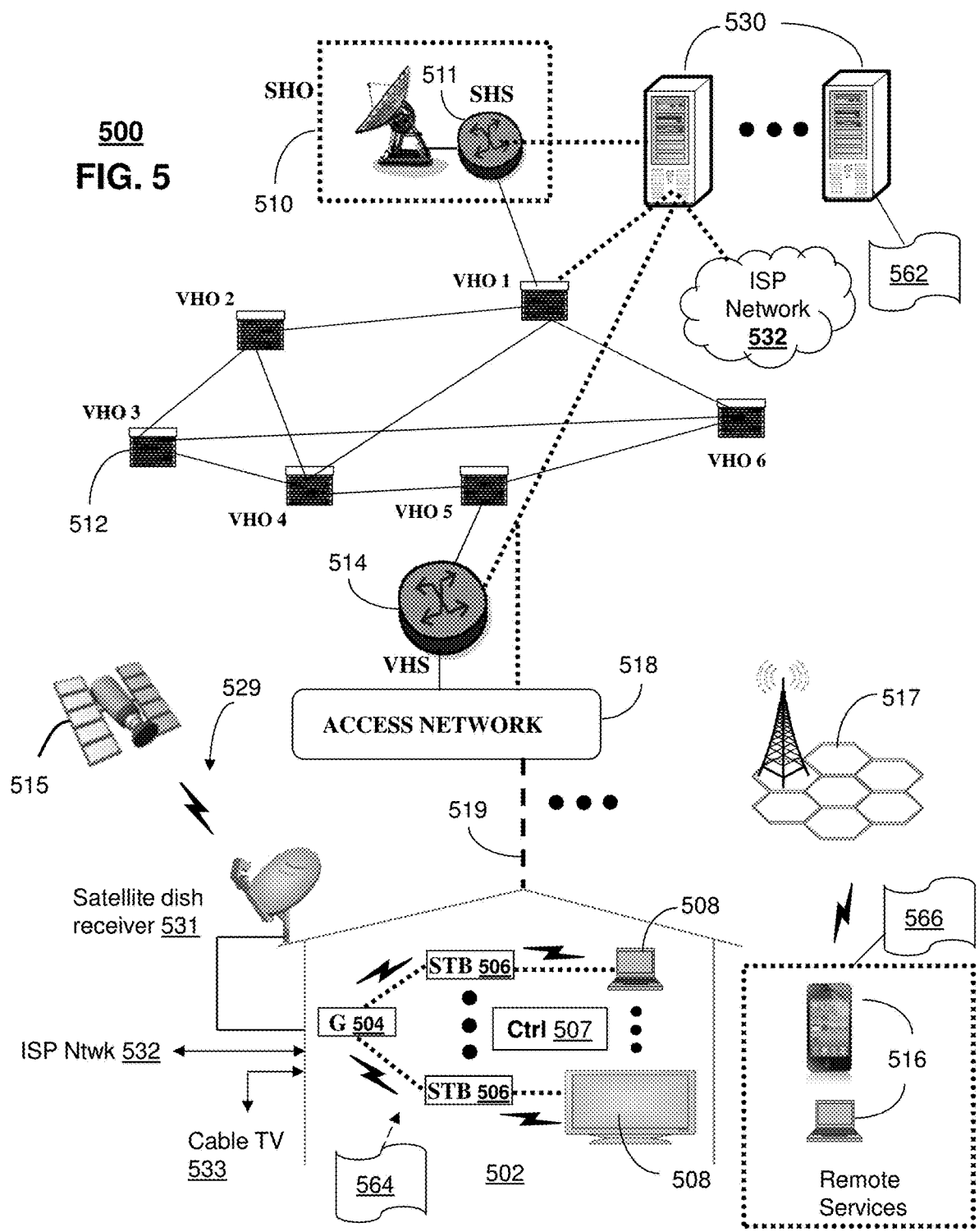
FIG. 5 depict illustrative embodiments of communication systems that provide services for storing correlated user information in a hierarchical database and generating an alert or a user experience based on the stored user information.

FIG. 5 depicts an illustrative embodiment of a communication system 500 for providing various communication services, such as delivering media content. The communication system 500 can represent an interactive media network, such as an interactive television system (e.g., an Internet Protocol Television (IPTV) media system). Communication system 500 can be overlaid or operably coupled with systems 100, 200, 300 of FIGS. 1-3 as another representative embodiment of communication system 500. For instance, one or more devices illustrated in the communication system 500 of FIG. 5 such as server 530 can receive first user information from a plurality of user devices and receive second user information from a plurality of external devices. Further, the server 530 can correlate, as described herein, among the first user information and second user information to generate a classification. In addition, the server 530 can store the first user information and the second user information in a hierarchical database according to the classification. Also, the server 530 can receive a request for a user experience, identity the classification from the request, and access the first user information and the second user information according to the classification. Further, the server 530 can generate the user experience according to the first user information and the second user information and present the user experience on a display of a communication device for a viewer. The user experience includes presentation of captured textual, audio, image, or video information included in the first user information and/or second user information.

In one or more embodiments, the communication system 500 can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol. The VHS 514 can distribute multimedia broadcast content via an access network 518 to commercial and/or residential buildings 502 housing a gateway 504 (such as a residential or commercial gateway).

The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as an application/correlation servers (herein referred to as application/correlation servers 530). The application/correlation servers 530 can use computing and communication technology to perform function 562, which can include among other things, the storing of correlated user information in a hierarchical database and generating a user experience techniques described by methods of FIGS. 4A-4B. For instance, function 562 of server 530 can be similar to the functions described for servers 116, 206 of FIGS. 1-3 in accordance with method 400. The media processors 506 and wireless communication devices 516 can be provisioned with software functions 564 and 566, respectively, to utilize the services of application/correlation servers 530. For instance, functions 564 and 566 of media processors 506 and wireless communication devices 516 can be similar to the functions described for the communication devices 108, 110, 112, 114, 122, 208, 308, 310, 312, and 316 of FIGS. 1-3 in accordance with method 400.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
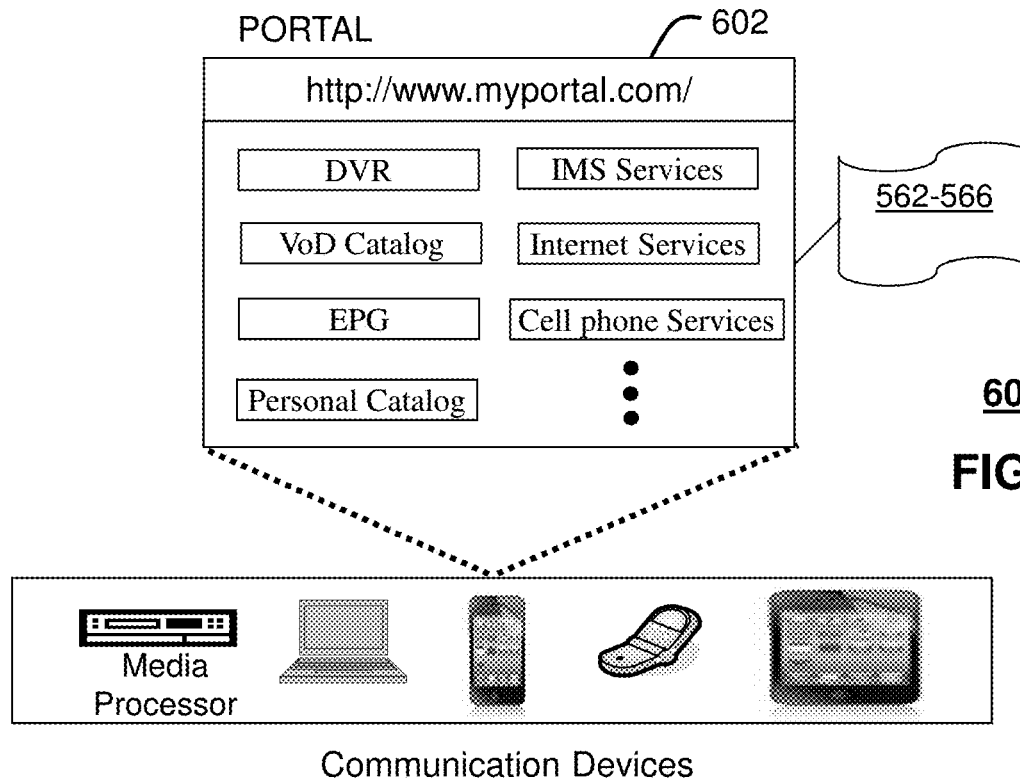
FIG. 6 depicts an illustrative embodiment of a web portal for interacting with the communication systems for storing correlated user information in a hierarchical database and generating an alert or a user experience based on the stored user information.

FIG. 6 depicts an illustrative embodiment of a web portal 602 of a communication system 600. Communication system 600 can be overlaid or operably coupled with systems 100, 200, 300 of FIGS. 1-3, and communication system 500 as another representative embodiment of systems 100, 200, 300 of FIGS. 1-3, and/or communication system 500. The web portal 602 can be used for managing services of systems 100, 200, 300 of FIGS. 1-3 and communication system 500. A web page of the web portal 602 can be accessed by a Uniform Resource Locator (URL) with an Internet browser using an Internet-capable communication device such as those described in FIGS. 1-3 and FIG. 5. The web portal 602 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 602 can also be used for provisioning IMS services described earlier, provisioning Internet services, provisioning cellular phone services, and so on.

The web portal 602 can further be utilized to manage and provision software applications 562-566 to adapt these applications as may be desired by subscribers and/or service providers of systems 100, 200, 300 of FIGS. 1-3, and communication system 500. For instance, users of the services provided by application/correlation servers 530 can log into their on-line accounts and provide the servers 530 with requests to access stored user information, requests for user experiences, message to assist in correlating user information to generate a classification to store the user information in a hierarchical database, and so on. Service providers can log onto an administrator account to provision, monitor and/or maintain the<systems 100, 200, 300 of FIGS. 1-3 or application/correlation servers 530.

Figure 7:
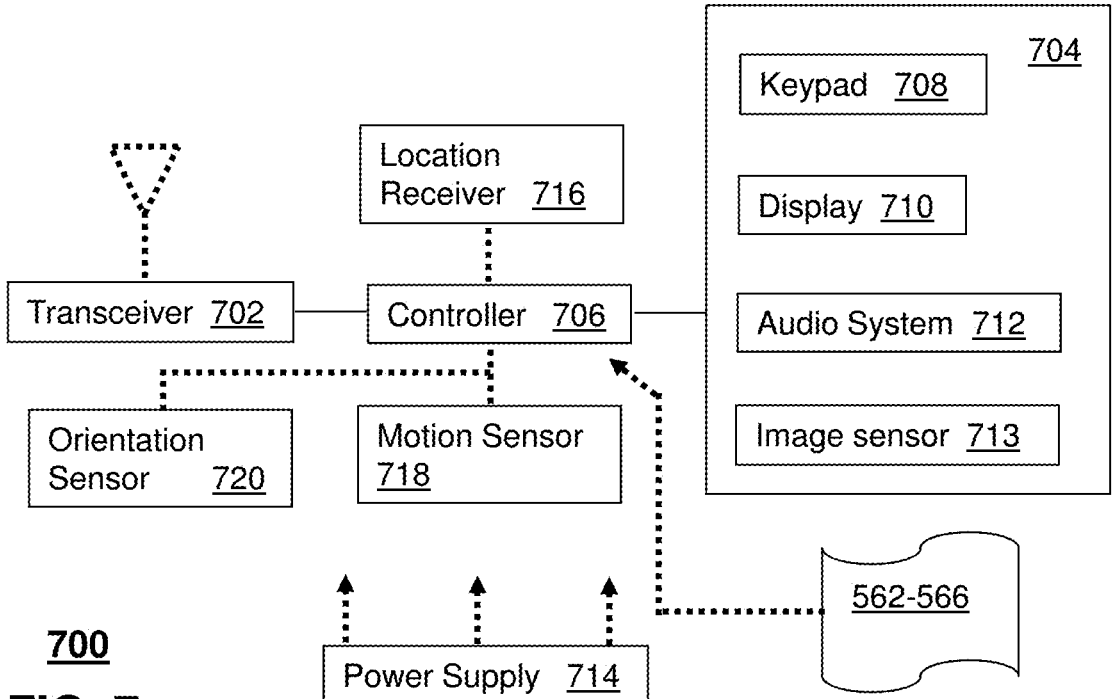
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1-3, and FIG. 5 and can be configured to perform portions of methods of FIGS. 4A-4B.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices 108, 110, 112, 114, 122, 208, 308, 310, 312, and 316 of FIGS. 1-3, the media processor 506, the media devices 508, or the portable communication devices 516 of FIG. 5, as well as the IMS CDs 601-602 and PSTN CDs 603-605 of FIG. 6. It will be appreciated that the communication device 700 can also represent other devices that can operate in [systems 100, 200, 300, of FIGS. 1-3, and communication system 500 of FIG. 5 such as a gaming console and a media player. In addition, the controller 706 can be adapted in various embodiments to perform the functions 562-566.

Upon reviewing the aforementioned embodiments, it would be evident to an artisan with ordinary skill in the art that said embodiments can be modified, reduced, or enhanced without departing from the scope of the claims described below. For example, features from any of embodiments described in FIGS. 1-5 can be combined with any other features of any other embodiments. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
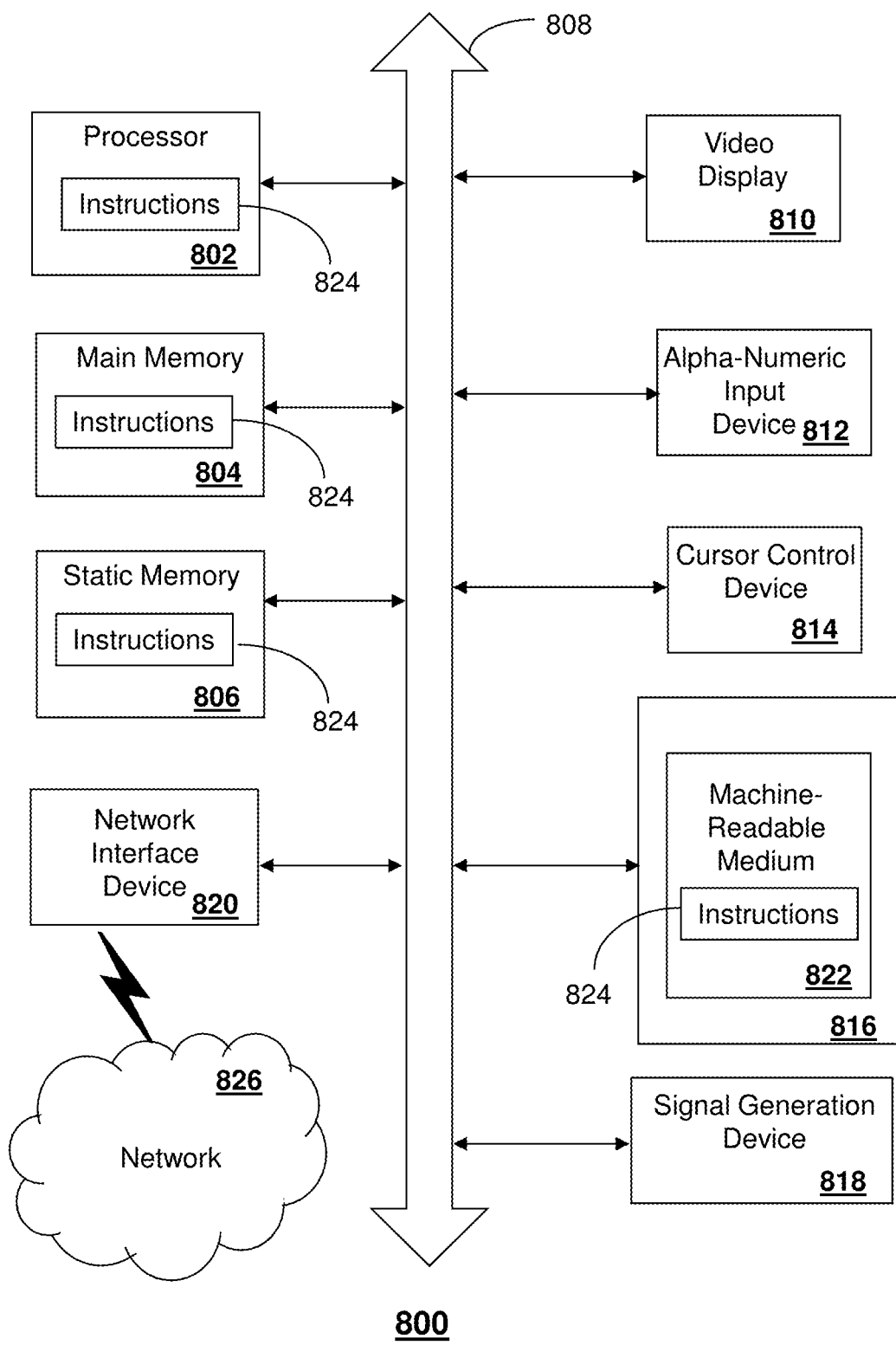
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the application/correlation servers 530, the media processor 506, hierarchical database 106, correlation server 116, location server 108, security camera 110, fitness tracker 122, mobile device 112, social media server 114, application server 206, communication device 208, communication devices 308, 310, 312, 316 and other devices of FIGS. 1-7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to:

solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A non-transitory machine-readable storage medium, comprising executable instructions that, when executed by a processing system including a processor, facilitate performance of operations, comprising:
receiving first user audio content and first user image content from a first group of communication devices, wherein at least a portion of the first user audio content and the first user image content is captured by a user;

receiving second user audio content and second user image content from a second group of communication devices, wherein at least a portion of the second user audio content and the second user image content is captured by a person other than the user, wherein the second user image content includes an image of the user when the user captures the first user image content;

obtaining biometric data from a third group of communication devices, wherein at least a portion of the biometric data is of the user;

obtaining a location of each of a portion of the first group of communication devices that captured the portion of the first user image content resulting in a first group of locations;

obtaining a location of each of a portion of the second group of communication devices that captured the portion of the second user image content resulting in a second group of locations;

identifying subject matter of the first user image content and the second user image content utilizing image recognition techniques;

correlating among the first user audio content, the first user image content, the second user audio content, the second user image content, the biometric data, the first group of locations, the second group of locations, and the subject matter of the first user image content and the subject matter of the second user image content— resulting in a correlation;

generating a classification for the first user audio content and the first user image content according to the correlation of the first user audio content, the first user image content, the biometric data, the first group of locations, the second group of locations, and the subject matter of the first user image content and the subject matter of the second user image content;

storing the first user audio content, the first user image content, the second user audio content, the second user image content, and the biometric data in a hierarchical database according to the classification;

receiving a request for a user experience;

accessing, from the hierarchical database, the first user audio content, the first user image content, the second user audio content, the second user image content, and the biometric data;

determining a range of emotional states in response to processing the first user audio content, the first user image content, the second user audio content, the second user image content, and the biometric data resulting in a determined range of emotional states, wherein the processing of the first user image content and the second user image content comprises identifying a first body language of the user in the first user image content and the second user image content resulting in a first identified body language and identifying a second body language of another person in the first user image content and the second user image content resulting in a second identified body language, wherein the determined range of emotional states corresponds to the identified first body language and the second identified body language;

selecting enhanced audio content and enhanced image content according to the determined range of emotional states, wherein the enhanced audio content includes a soundtrack that was not included in the first user audio content and the second user audio content, wherein the soundtrack is selected according to the determined range of emotional states, wherein the enhanced image content includes adjusted playback of the first user image content and the second user image content, wherein speed of the adjusted playback of the first user image content and the second user image content is adjusted according to the determined range of emotional states;

generating the user experience for a viewer in response to receiving the request, wherein the user experience includes a portion of the first user audio content, the second user audio content, the first user image content, the second user image content, the enhanced audio content, and the enhanced image content to attempt provide an emotive response from the viewer similar to the determined range of emotional states; and presenting the user experience on a display for the viewer.

2. The non-transitory machine-readable storage medium of claim 1, wherein the enhanced image content comprises an increased resolution version of a portion of an image of the first user image content.

3. The non-transitory machine-readable storage medium of claim 2, wherein the viewer includes the user, wherein the processing of the first user audio content comprises at least one of utilizing voice recognition techniques or identifying a tone of voice, and wherein the determining of the range of emotional states is based on the tone of voice.

4. The non-transitory machine-readable storage medium of claim 1, wherein the processing of the first user image content comprises processing the first user image content using the image recognition techniques.

5. The non-transitory machine-readable storage medium of claim 4, wherein the determining of the range of emotional states includes determining the emotional state of the user based on the first body language of the user in the first user image content and determining the emotional state of the other person based on the second body language of the other person in the first user image content.

6. The non-transitory machine-readable storage medium of claim 1, wherein the biometric data includes heartrate and blood pressure of the user, wherein the operations comprise processing the biometric data, wherein the processing of the biometric data comprises determining an emotional state of the user based on processing the heartrate and determining the emotional state of the user based on processing the blood pressure.

7. The non-transitory machine-readable storage medium of claim 1, wherein the operations comprise:

determining a first day and a first time-of-day associated with the first user audio content and the first user image content;

obtaining previous user audio content and previous user image content from the hierarchical database, wherein the previous user audio content and the previous user image content is associated with a second day and a second time-of-day;

determining that the first day and the first time-of-day of the first user audio content and the first user image content is associated with the second day and the second time-of-day of the previous user audio content the previous user image content; and obtaining a second classification associated with the previous user audio content and the previous user image content, wherein the generating of the classification for the first user audio content and the first user image content comprises generating the classification for the first user audio content and the first user image content based on the second classification associated with the previous user audio content and the previous user image content.

8. A method, comprising:
receiving, by a processing system including a processor, first user audio content and first user image content from a first group of communication devices, wherein at least a portion of the first user audio content and the first user image content is captured by a user;
receiving, by the processing system, second user audio content and second user image content from a second group of communication devices, wherein at least a portion of the second user audio content and the second user image content is captured by a person other than the user, wherein the second user image content includes an image of the user when the user captures the first user image content;
obtaining, by the processing system, biometric data from a third group of communication devices;
obtaining, by the processing system, a location of each of a portion of the first group of communication devices that captured the portion of the first user image content resulting in a first group of locations;
obtaining, by the processing system, a location of each of a portion of the second group of communication devices that captured the portion of the second user image content resulting in a second group of locations;
identifying, by the processing system, subject matter of the first user image content and the second user image content utilizing image recognition techniques;
correlating, by the processing system, among the first user audio content, the first user image content, the second user audio content, the second user image content, the biometric data, the first group of locations, the second group of locations, and the subject matter of the first user image content and the subject matter of the second user image content resulting in a correlation to generate a classification;
generating, by the processing system, a classification for the first user audio content and the first user image content according to the correlation of the first user audio content, the first user image content, the biometric data, the first group of locations, the second group of locations, and the subject matter of the first user image content and the subject matter of the second user image content;
storing, by the processing system, the first user audio content, the first user image content, the second user audio content, the second user image content, and the biometric data in a hierarchical database according to the classification;
receiving, by the processing system, a request for a user experience;
accessing, by the processing system, from the hierarchical database in response to the request, the first user audio content, the first user image content, the second user audio content, the second user image content, and the biometric data;
determining, by the processing system, a range of emotional states of the user in response to processing the first user audio content, the first user image content, the second user audio content, the second user image content, and the biometric data resulting in a determined range of emotional states, wherein the processing of the first user image content and the second user image content comprises identifying a first body language of the user in the first user image content and the second user image content resulting in a first identified body language and identifying a second body language of another person in the first user image content and the second user image content resulting in a second identified body language, wherein the determined range of emotional states corresponds to the identified first body language and the second identified body language;
selecting, by the processing system, enhanced audio content and enhanced image content according to the determined range of emotional states, wherein the enhanced audio content includes a soundtrack that was not included in the first user audio content and the second user audio content, wherein the soundtrack is selected according to the determined range of emotional states, wherein the enhanced image content includes adjusted playback of the first user image content and the second user image content, wherein speed of the adjusted playback of the first user image content and the second user image content is adjusted according to the determined range of emotional states;
generating, by the processing system, the user experience for a viewer in response to receiving the request, wherein the user experience includes a portion of the first user audio content, the second user audio content, the first user image content, the second user image content, the enhanced audio content, and the enhanced image content to attempt provide an emotive response from the viewer similar to the determined range of emotional states; and
presenting, by the processing system, the user experience on a display for the viewer.

9. The method of claim 8, wherein the processing of the first user audio content comprises processing, by the processing system, the first user audio content using voice recognition techniques.

10. The method of claim 9, wherein the processing of the first user audio content comprises identifying, by the processing system, a tone of voice and wherein the determining of the range of emotional states in response to the processing of the first user audio content is based on the tone of voice.

11. The method of claim 8, wherein the processing of the first user image content comprises processing, by the processing system, the first user image content using the image recognition techniques.

12. The method of claim 11, wherein the determining of the range of emotional states includes determining, by the processing system, the emotional state of the user based on the first body language of the user in the first user image content and determining, by the processing system, the emotional state of the other person based on the second body language of the other person in the first user image content.

13. The method of claim 8, wherein the biometric data includes heartrate and blood pressure of the user, wherein the method further comprises processing, by the processing system, the biometric data, wherein the processing of the biometric data comprises determining, by the processing system, an emotional state of the user based on processing, by the processing system, the heartrate and determining, by the processing system, the emotional state of the user based on processing, by the processing system, the blood pressure.

14. The method of claim 8, comprising:
determining, by the processing system, a first day and a first time-of-day associated with the first user audio content and the first user image content;
obtaining, by the processing system, user audio content associated with a second user and user image content associated with the second user from the hierarchical database that is associated with a second day and a second time-of-day;

determining, by the processing system, that the first day and the first time-of-day is associated with the second day and the second time-of-day; and obtaining, by the processing system, a second classification associated with the user audio content associated with the second user and the user image content associated with the second user, wherein the generating of the classification for the first user audio content and the first user image content comprises generating, by the processing system, the classification for the first user audio content and the first user image content based on the second classification of the user audio content associated with the second user and the user image content associated with the second user.

15. A system, comprising:

a processing system including a processor; and a memory that stores executable instructions that, when executed by the processing system, facilitate performance of operations, comprising:

receiving first user audio content and user image content from a first group of communication devices, wherein at least a portion of the first user audio content and the first user image content is captured by a user;

receiving second user audio content and the second user image content from a second group of communication devices, wherein at least a portion of the second user audio content and the second user image content is captured by a person other than the user, wherein the second user image content includes an image of the user when the user captures the first user image content;

obtaining biometric data from a third group of communication devices;

obtaining a location of each of a portion of the first group of communication devices that captured the portion of the first user image content resulting in a first group of locations;

obtaining a location of each of a portion of the second group of communication devices that captured the portion of the second user image content resulting in a second group of locations;

identifying subject matter of the first user image content and the second user image content utilizing image recognition techniques;

correlating among the first user audio content, the first user image content, the second user audio content, the second user image content, the biometric data, the first group of locations, the second group of locations, and the subject matter of the first user image content and the subject matter of the second user image content resulting in a correlation;

generating a classification for the first user audio content and the first user image content according to the correlation of the first user audio content, the first user image content, the biometric data, the first group of locations, the second group of locations, and the subject matter of the first user image content and the subject matter of the second user image content;

storing the first user audio content, the first user image content, the second user audio content, the second user image content, and the biometric data in a hierarchical database according to the classification;

receiving a request for a user experience;

accessing, from the hierarchical database, the first user audio content, the first user image content, the second user audio content, the second user image content, and the biometric data;

determining a range of emotional states of a user in response to processing the first user audio content, the first user image content, the second user audio content, the second user image content, and the biometric data resulting in a determined range of emotional states, wherein the processing of the first user audio content and the second user audio content comprises identifying a first tone of voice of the user in the first user audio content and second user audio content resulting in an identified first tone of voice and identifying a second tone of voice of another person in the first user audio content and the second user audio content resulting in an identified second tone of voice, wherein the determined range of emotional states corresponds to the identified first tone of voice and the second identified tone of voice;

selecting enhanced audio content and enhanced image content according to the determined range of emotional states, wherein the enhanced audio content includes a soundtrack that was not included in the first user audio content and the second user audio content, wherein the soundtrack is selected according to the determined range of emotional states, wherein the enhanced image content includes adjusted playback of the first user image content and the second user image content, wherein speed of the adjusted playback of the first user image content and the second user image content is adjusted according to the determined range of emotional states;

generating the user experience for a viewer in response to receiving the request, wherein the user experience includes a portion of the first user audio content, the second user audio content, the first user image content, the second user image content, the enhanced audio content, and the enhanced image content to attempt provide an emotive response from the viewer similar to the determined range of emotional states; and presenting the user experience on a display for the viewer.

16. The system of claim 15, wherein the processing of the user audio content comprises processing the first user audio content using voice recognition techniques.

17. The system of claim 16, wherein the determining of the range of emotional states includes determining the emotional state of the user based on the first tone of voice of the user in the first user audio content and determining the emotional state of the other person based on the second tone of voice of the other person in the first user audio content.

18. The system of claim 15, wherein the processing of the first user image content comprises processing the first user image content using the image recognition techniques.

19. The system of claim 18, wherein the processing of the first user image content comprises identifying a body language, and wherein the determining of the range of emotional states in response to the processing of the first user image content is based on the body language.

20. The system of claim 15, wherein the biometric data includes heartrate and blood pressure of the user, wherein the operations comprise processing the biometric data, wherein the processing of the biometric data comprises determining an emotional state of the user based on processing the heartrate and determining the emotional state of the user based on processing the blood pressure.

* * * * *